United States Patent [19]

Tanigaki et al.

[11] 4,057,706
[45] Nov. 8, 1977

[54] COATING COMPOSITION AND A COATED ELECTRODE FOR ARC WELDING

[75] Inventors: Takashi Tanigaki, Yokohama; Yoshikazu Tanaka, Sagamihara; Takeshi Koshio, Yokohama, all of Japan

[73] Assignee: Nippon Steel Corporation, Tokyo, Japan

[21] Appl. No.: 675,271

[22] Filed: Apr. 9, 1976

[30] Foreign Application Priority Data

Apr. 18, 1975  Japan .................................. 50-46547

[51] Int. Cl.$^2$ ............................................. B23K 35/22
[52] U.S. Cl. ........................................ 219/146; 148/23
[58] Field of Search .......................... 219/146; 148/23

[56] References Cited

U.S. PATENT DOCUMENTS 3,453,142  7/1969  Dorschu ............................ 219/146

FOREIGN PATENT DOCUMENTS 1,377,961  4/1971  United Kingdom ................. 148/23

Primary Examiner—E. A. Goldberg
Attorney, Agent, or Firm—Toren, McGeady and Stanger

[57] ABSTRACT

A coating composition for a welding electrode comprising 35 to 55% $CaCO_3$, 1 to 8% $Fe_2O_3$, 1 to 7% $CaF_2$, with the ratio of $Fe_2O_3$ to $CaF_2$ being from 0.4 to 1.6, 1 to 5% Mn, 4 to 9% Si and 2 to 9% Ni with the balance being a slag forming agent, an arc stabilization agent and a binding agent.

4 Claims, 2 Drawing Figures

COATING COMPOSITION AND A COATED ELECTRODE FOR ARC WELDING

BACKGROUND OF THE INVENTION

1. Field of the Invention

The present invention relates to a coating composition for a coated electrode for arc welding, particularly a low-hydrogen coating composition for a coated electrode for arc welding, and a coated electrode for arc welding coated with the coating composition. The coated electrode of the present invention is particularly suitable for arc welding butt joint portions of a horizontal steel pipe with flat position, vertical-downward position and overhead position successively from the top to the bottom of the steel pipe.

2. Description of Prior Art

For welding butt joints of fixed horizontal steel pipes, a downward welding method which welds from the top to the bottom using a high-cellulose electrode and an upward welding method which welds from the bottom to the top using a low hydrogen electrode have been widely practised.

The high-cellulose electrode due to its advantages that the amount of slag produced is small and good penetration is obtained, so that a vertical downward welding is easily performed, with high welding efficiency, has been widely used for many years in Europe and America. However, in recent years as a high tensile strength steel pipe having a tensile strength not lower than 50 Kg/mm$^2$ has been increasingly used, the high-cellulose electrode is often confronted with problems of root cracking and under-bead cracking due to hydrogen in the deposited metal.

These cracking may be prevented by preheating, but the preheating is troublesome and is not economical because it causes additional fuel cost.

Moreover, welded steel pipes are increasingly used in cold regions and in this application the high-cellulose electrode cannot give satisfactory notch toughness.

Meanwhile, the low-hydrogen electrode gives excellent notch toughness to the deposited metal, but as the upward welding method using this electrode is done with a current density 20 to 30% lower than that used in the downward welding method, the welding efficiency is lower about 50% than that of the downward welding method.

The conventional welding electrodes, as mentioned above, have their advantages and defects and have been unsuccessful in satisfying all requirements for welding a horizontal steel pipe.

Therefore, there has been strong demand for the development of an electrode which can give excellent notch toughness to the deposited metal and easily perform a downward welding with flat, vertical and overhead positions from the reverse-side-bead of the root pass to the cap-pass.

SUMMARY OF THE INVENTION

The present invention provides improved low-hydrogen coating composition for an electrode which overcomes the above defects and problems confronted with by the conventional electrodes.

The coating composition according to the present invention comprises 35 to 55%, preferably 40 to 53% $CaCO_3$; 1 to 8%, preferably 1 to 6% $Fe_2O_3$; 1 to 7% $CaF_2$ with the ratio of $Fe_2O_3$ to $CaF_2$ being 0.4 to 1.6, preferably 0.6 to 1.2; 1 to 5% Mn; 4 to 9% Si; 2 to 9%, preferably 4 to 9% Ni with the balance being a forming agent, an arc stabilizing agent and a binding agent, and the electrode according to the present invention comprises a mild steel core wire coated with the above coating composition. Further the coating composition according to the present invention may further comprises not more than 30%, preferably 5 to 20% by weight of iron powder on the basis of the total weight of the coating composition.

DETAILED DESCRIPTION OF THE INVENTION

The present invention will be described in detail referring to the attached drawings.

Figure 1A:
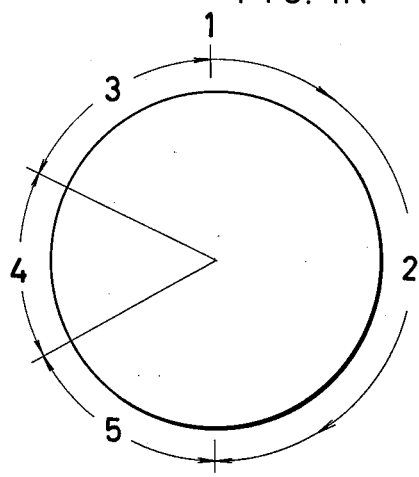
FIG. 1(A) shows the welding method and the welding positions, and FIG. 1(B) showing the deposition of layers.

Hereinunder the functions and limitations of various components of the coating composition according to the present invention will be described.

$CaCO_3$ plays as a gas generating source, and, less than 35%, it does produce an enough amount of gas for shielding the arc so that pits are allowed to occur, and the slag viscosity is lowered and the molten slag prevents the vertical downward welding. On the other hand, more than 55% $CaCO_3$ increases the slag viscosity and worsens the slag covering action so that the bead shape deteriorates.

$Fe_2O_3$ contributes to spreading of the molten metal and provides conditions favourable for the fusion into the base metal. However, less than 1% $Fe_2O_2$ does not give satisfactory fusibility into the base metal. On the other hand, more than 8% $Fe_2O_3$ worsens the slag removability and increases occurrence of spatters.

The iron powder usually contained in the coating composition contains a very small amount of FeO and $Fe_2O_3$ an impurity, and thus the coating composition with addition of the iron powder contains necessarily $Fe_2O_3$, and its content is less than 0.5% at largest and such a level of $Fe_2O_3$ content cannot contribute to the spreading of molten metal and improve the fusion into the base metal.

$CaF_2$ is effective to adjust the melting point of the coating composition and the solidification speed of the slag, but less than 1% $CaF_2$ increases the melting point of the coating composition too high and increases excessively the solidification speed of the slag so that flat and overhead welding are hard to perform. On the other hand, $CaF_2$ exceeding 7% lowers excessively the melting point of the coating composition, and lowers excessively the solidification speed of the slag so that the molten slag precedes in the vertical downward welding to hinder the welding and make the arc unstable.

The reason for limiting the ratio of $Fe_2O_3$ to $CaF_2$ to the range from 0.4 to 1.6 in the present invention is as set forth below.

It has been discovered by the present inventors that the desired surface tension and viscosity of the slag can be obtained only when the ratio $Fe_2O_3/CaF_2$ is limited to the specific range so that the welding can be performed satisfactorily all in the flat, vertical-downward and overhead welding. Namely, this range permits full developments and co-operation of the functions of each of $Fe_2O_3$ and $CaF_2$; $Fe_2O_3$ being effective to adjust the slag viscosity and to improve the spreading of the molten metal and the fusion into the base metal; $CaF_2$ being effective to adjust the melting point of the coating composition and the slag solidification speed, and improve the welding efficiency.

$Fe_2O_3$ and $CaF_2$ present in the above specific range cooperate to refine the droplets, smoothen the transfer of the droplets and provide a very excellent atmosphere for arc welding, a slag viscosity and a slag solidification speed very favourable for all welding positions in the downward welding method, so that better condition is assured for the fusibility into the base metal as well as for formation of excellent beads in all welding procedures from the back-bead welding for the root layer to the cap-pass welding, and the welding is facilitated.

When the ratio is lower than 0.4, the surface tension of the slag lowers so that the molten metal tends more often to drop down and hinder the welding, and the arc blowing is weakened and the arc concentration is worsened so that the fusion into the base metal is unsatisfactory.

On the other hand, when the ratio is higher than 1.6 the reverse-side-bead in the root layer takes a concave shape and the welding with a flat or overhead position is difficult, and the slag removability is hard, thus lowering the welding efficiency.

Regarding Mn, when the Mn content is less than 1%, the Mn content in the deposited metal is not enough for assuring the desired notch toughness at lower temperatures. On the other hand, Mn contents more than 5% lowers the resistance to cracking and worsens the slag removability. Si acts as deoxidizer and is effective to prevent blow holes which occur in the weld beads. Si contents less than 4.0% does not give satisfactory deoxidation so that blow holes are easily caused in the deposited metal, while Si contents more than 9% cause excessive deoxidation so that pits are caused in the weld beads, and increase excessively the slag viscosity so that satisfactory beads cannot be obtained and the notch toughness at low temperatures lowers.

The addition of Ni improves further the notch toughness at low temperatures, and with less than 2% Ni the notch toughness at low temperatures is not enough and varies considerably, while with more than 9% Ni hot crackings are easily caused.

The optional addition of not larger than 30% of the iron powder is made for the purpose of increasing the deposition improving the welding efficiency and refining the droplets to smoothen their transfer. Additions of the iron powder more than 30% weaken the cup of coating and makes the cup too shallow so that the arc causes often shortening during the welding and thus the welding is unstable.

The coating composition according to the present invention contains a suitable amount of a slag forming agent, an arc stabilization agent and a binding agent.

As for the slag forming agent, $Na_3AlF_6$ for examle may be used, and as for the arc stabilization agent $TiO_2$ and $BaCO_3$ may be used. These agents are mixed with the binding agent such as water glass and the mixture is compressed into desired shapes, and coated on a mild steel wire by means of a high-pressure automatic coating machine, and the coated wire is dried and baked to obtain a coated electrode.

PREFERRED EMBODIMENT OF THE INVENTION

The present invention will be more clearly understood from the following examples.

The examples of the coating composition according to the present invention, their welding usability, bead shapes and notch toughness are shown in Table 1.

Table 1

|  |  | Coating Compositions (%) |  |  |  |  |  |  |  |  | $Fe_2O_3$ to $CaF_2$ |
|---|---|---|---|---|---|---|---|---|---|---|---|
|  |  | $CaCO_3$ | $Fe_2O_3$ | $CaF_2$ | $SiO_2$ | Mn | Si | Ni | Fe powder | Others* |  |
| Comparative | A - 1 | 49.1 | — | 21.7 | 8.0 | 2.5 | 7.5 | — | — | 11.2 | — |
|  | A - 2 | 52.4 | — | 9.2 | 12.5 | 2.5 | 9.5 | — | 6.5 | 7.4 | — |
|  | B - 1 | 54.7 | 7.8 | 6.7 | 7.2 | 3.8 | 7.5 | 8.8 | — | 3.5 | 1.16 |
|  | B - 2 | 54.7 | 6.7 | 4.2 | 6.0 | 3.4 | 7.7 | 7.5 | 5.4 | 4.4 | 1.60 |
|  | B - 3 | 54.7 | 3.5 | 6.7 | 6.2 | 1.4 | 8.8 | 3.4 | 11.5 | 3.8 | 0.52 |
|  | B - 4 | 52.7 | 3.6 | 5.9 | 6.6 | 2.6 | 8.1 | 4.2 | 12.5 | 3.8 | 0.61 |
| Present | B - 5 | 48.1 | 4.3 | 3.5 | 6.1 | 2.1 | 8.1 | 2.9 | 21.7 | 3.2 | 1.23 |
|  | B - 6 | 46.2 | 1.4 | 1.9 | 6.6 | 4.8 | 5.2 | 5.5 | 25.0 | 3.4 | 0.74 |
| Invention | B - 7 | 45.7 | 2.2 | 1.4 | 5.9 | 3.4 | 6.0 | 6.5 | 25.0 | 3.9 | 1.57 |
|  | B - 8 | 45.6 | 2.7 | 3.2 | 6.6 | 2.7 | 6.7 | 6.8 | 22.0 | 3.7 | 0.84 |
|  | B - 9 | 45.4 | 1.8 | 4.5 | 6.0 | 4.4 | 4.3 | 2.2 | 27.5 | 3.9 | 0.40 |
|  | B - 10 | 42.4 | 5.4 | 5.4 | 6.6 | 2.5 | 7.5 | 7.5 | 19.3 | 3.4 | 1.00 |
|  | B - 11 | 38.2 | 2.5 | 2.5 | 8.2 | 2.4 | 7.8 | 5.1 | 29.0 | 4.3 | 1.00 |
|  | C - 1 | 57.1 | 3.5 | 4.6 | 6.3 | 1.7 | 8.3 | 2.7 | 12.3 | 3.5 | 0.76 |
|  | C - 2 | 54.7 | 7.9 | 7.7 | 7.7 | 4.7 | 4.5 | 9.4 | — | 3.4 | 1.02 |
|  | C - 3 | 49.7 | 1.2 | 0.8 | 7.7 | 3.2 | 7.5 | 1.7 | 23.7 | 4.5 | 1.50 |
| Comparative | C - 4 | 53.2 | 0.7 | 2.0 | 6.4 | 2.5 | 9.4 | 2.4 | 19.9 | 3.5 | 0.35 |
|  | C - 5 | 45.7 | 8.2 | 6.5 | 6.2 | 0.7 | 8.7 | 6.0 | 14.1 | 3.9 | 1.26 |
|  | C - 6 | 45.7 | 6.2 | 3.8 | 6.2 | 5.4 | 6.0 | 6.0 | 16.5 | 4.2 | 1.63 |
|  | C - 7 | 34.2 | 5.1 | 7.4 | 6.4 | 3.4 | 3.7 | 4.4 | 32.3 | 3.1 | 0.69 |

*Others: $Al_2O_3$, $K_2O$, $TiO_2$, etc.

|  |  | Welding Easiness and Bead Shape | | | Notch | |
|---|---|---|---|---|---|---|
|  |  | Flat | Vertical-Downward | Overhead | Toughness** vE-29 (KG-m) | General Evaluation |
| Comparative | A - 1 | Bad | Bad | Good | 2.2 – 10.5 | Bad |
|  | A - 2 | Bad | Bad | Good | 1.8 – 4.6 | Bad |
|  | B - 1 | Good | Good | Good | 15.2 – 18.6 | Good |
|  | B - 2 | Good | Good | Good | 12.4 – 15.7 | Good |
|  | B - 3 | Good | Good | Good | 10.8 – 12.8 | Good |
|  | B - 4 | Good | Good | Good | 11.8 – 13.4 | Good |
| Present | B - 5 | Good | Good | Good | 7.9 – 9.8 | Good |
|  | B - 6 | Good | Good | Good | 7.7 – 12.2 | Good |
| Invention | B - 7 | Good | Good | Good | 9.8 – 11.8 | Good |
|  | B - 8 | Good | Good | Good | 12.2 17.3 17.3 | Good |
|  | B - 9 | Good | Good | Good | 6.8 – 11.8 | Good |
|  | B - 10 | Good | Good | Good | 12.0 – 16.7 | Good |

Table 1-continued

| | | | | | | |
|---|---|---|---|---|---|---|
| | B - 11 | Good | Good | Good | 15.6 – 17.8 | Good |
| Comparative | C - 1 | Bad | Good | Bad | 8.2 – 9.1 | Bad |
| | C - 2 | Good | Bad | Good | 8.0 – 12.2 | Bad |
| | C - 3 | Bad | Bad | Bad | 3.6 – 14.4 | Bad |
| | C - 4 | Bad | Bad | Bad | 7.2 – 15.7 | Bad |
| | C - 5 | Bad | Bad | Bad | 3.8 – 11.2 | Bad |
| | C - 6 | Bad | Bad | Bad | 7.7 – 15.5 | Bad |
| | C - 7 | Bad | Bad | Good | 10.8 – 17.4 | Bad |

**The notch toughness is shown by the minimum and maximum values obtained by testing each for fivetest pieces and when the five test pieces show a value of 4.8 Kg-m or higher, the evaluation is good.

The coating composition shown in Table 1 were coated on mild steel wires of 4.0mm diameter and 400mm length by a conventional method, and the butt joints of fixed horizontal steel pipes of API5LX-X52 of 609mm diameter and 12.7mm thickness were welded from the top to the bottom by a downward welding method as shown in FIG. 1(A) under the standard welding conditions:

| | |
|---|---|
| Groove Angle | 60° |
| Root Face | 1.5mm |
| Root Gap | 2.5mm |
| Current Density | 165 Amp |
| Welding Speed | 300mm/min. |

Figure 1B:
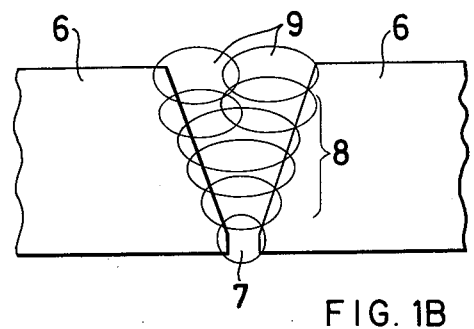
FIGS. 1 (A) and (B) are a schematic view showing welding procedures of a fixed horizontal steel pipe by a downward method.

In the drawings, 1 represents the starting point for welding, 2 represents the direction of the welding, and 3, 4 and 5 represent sections for the flat position, the vertical-downward position and the overhead position respectively. FIG. 1(B) shows schematically deposition of layers and 6 represents the base metal. 7 represents the back layer, 8 is the building layer, and 9 is the cap-pass layer.

As for evaluation of the notch toughness, test pieces (No.4 test piece according to JIS Z 2204) were taken from the joints and tested each for five test pieces according to the testing method of JIS Z 2242 at $-29°$ C, and when all the five test pieces showed a value of 4.8 Kg-m or higher, the evaluation was defined as "good."

Conclusions may be made as below from the results shown in Table 1.

1. The coating compositions A-1 and A-2 are respectively a representative conventional coating composition for a low-hydrogen coated electrode, and A-1 is useful for all welding positions and A-2 is useful for a reverse-side-bead welding with a vertical-upward position.

When the butt joint of a fixed horizontal steel pipe is welded by a downward welding from the top to the bottom using electrodes coated with these compositions, the flowability of the molten slag is not satisfactory so that the molten slag precedes in the vertical-downward welding to hinder the welding, and the reverse-side-bead is not formed and the fusion into the base metal is worse.

2. B-1 to B-11 represent the coating composition within the scope of the present invention, and provide good welding efficiency, good fusibility into the base metal, satisfactory reverse-side and face bead shape, and excellent notch toughness without occurrence of blow holes and pits in the weld metal.

3. C-1 to C-7 represent comparative coating compositions in which proportions of various components are outside the scope of the present invention, and fail to satisfy various test requirements.

As clearly understood from the above description and examples, the present invention provides a coated electrode which makes it possible to weld efficiently the butt joint of a horizontal steel pipe by a downward welding method all through from the reverse-side-bead for the root layer to the cap-pass welding, and moreover, the coated electrode of the present invention makes it possible to obtain good reverse-side-beads in the welding of the root layer and eliminates the welding defects such as pits, blow holes and unsatisfactory fusibility into the base metal in the welding including the second layer welding to the finishing welding, and provides excellent notch toughness at low temperatures and excellent resistance against cracking of the weld metal.

Concludingly, the present invention is very useful in wide applications because excellent welding properties and welding efficiency can be assured for general steel pipes high strength steel pipes as well as for low-temperature steel pipes, and satisfactory cracking resistance and notch toughness can be obtained even in applications in the cold regions.

What is claimed:

1. A coating composition for a welding electrode comprising 35 to 55% $CaCO_3$, 1 to 8% $Fe_2O_3$, 1 to 7% $CaF_2$, with the ratio of $Fe_2O_3$ to $CaF_2$ being from 0.4 to 1.6, 1 to 5% Mn, 4 to 9% Si and 2 to 9% Ni with the balance being a slag forming agent, an arc stabilization agent and a binding agent.

2. A coating composition according to claim 1 which further comprises not more than 30% by weight of iron powder on the basis of the total weight of the composition.

3. A coated electrode for arc welding comprising a mild steel core wire coated with a coating composition comprising 35 to 55% $CaCO_3$, 1 to 8% $Fe_2O_3$, 1 to 7% $CaF_2$, with the ratio of $Fe_2O_3$ to $CaF_2$ being from 0.4 to 1.6, 1 to 5% Mn, 4 to 9% Si and 2 to 9% Ni with the balance being a slag forming agent, an arc stabilization agent and a binding agent.

4. A coated electrode according to claim 3 in which the coating composition further comprises not more than 30% by weight of iron powder on the basis of the total weight of the composition.

* * * * *